(12) United States Patent
Novak et al.

(10) Patent No.: US 8,603,551 B1
(45) Date of Patent: Dec. 10, 2013

(54) SELECTIVE FEEDING OF STARCH TO INCREASE MEAT, EGG PRODUCTION OR FEED CONVERSION IN POULTRY

(75) Inventors: Curtis L. Novak, Kansas City, MO (US); David C. Weakley, Pacific, MO (US)

(73) Assignee: Forage Genetics International, LLC, West Salem, WI (US)

( * ) Notice: Subject to any disclaimer, the term of this patent is extended or adjusted under 35 U.S.C. 154(b) by 402 days.

(21) Appl. No.: 12/830,012

(22) Filed: Jul. 2, 2010

Related U.S. Application Data

(60) Provisional application No. 61/222,782, filed on Jul. 2, 2009.

(51) Int. Cl.
    *A23K 1/18* (2006.01)
(52) U.S. Cl.
    USPC ............... 426/2; 426/658; 426/805; 426/807
(58) Field of Classification Search
    USPC .............. 426/2, 658, 807, 805, 656
    See application file for complete search history.

(56) References Cited

U.S. PATENT DOCUMENTS

| | | | |
|---|---|---|---|
| 3,250,622 A | 5/1966 | Brooks | |
| 4,333,923 A | 6/1982 | Beck et al. | |
| 4,508,737 A | 4/1985 | Forest et al. | |
| 4,615,891 A | 10/1986 | Nocek et al. | |
| 4,617,276 A | 10/1986 | Nocek | |
| 4,886,659 A | 12/1989 | Baines et al. | |
| 4,957,748 A | 9/1990 | Winowiski | |
| 5,023,091 A | 6/1991 | Winowiski | |
| 5,030,468 A | 7/1991 | Van Lengerich et al. | |
| 5,143,737 A | 9/1992 | Richardson | |
| 5,158,791 A | 10/1992 | Nocek et al. | |
| 6,008,053 A | 12/1999 | Williams | |
| 7,174,672 B2 * | 2/2007 | Beck | 47/58.1 FV |
| 7,490,437 B1 | 2/2009 | Beck | |
| 7,550,172 B2 | 6/2009 | Weakley et al. | |
| 2003/0165487 A1 | 9/2003 | Tricarico et al. | |
| 2004/0180124 A1 | 9/2004 | Beck et al. | |
| 2005/0000457 A1 | 1/2005 | Beck | |
| 2005/0271788 A1 | 12/2005 | Lanter et al. | |
| 2007/0254049 A1 | 11/2007 | Beck et al. | |
| 2008/0026129 A1 | 1/2008 | Beck | |
| 2008/0058419 A1 * | 3/2008 | Janssens et al. | 514/561 |
| 2008/0145476 A1 | 6/2008 | Beck | |

(Continued)

FOREIGN PATENT DOCUMENTS

| | | |
|---|---|---|
| EP | 0061881 A1 | 10/1982 |
| EP | 1352567 A1 | 10/1982 |

(Continued)

OTHER PUBLICATIONS

Weurding et al. J. Nutr., 131: 2329-2335, 2001.*

(Continued)

*Primary Examiner* — Chhaya Sayala
(74) *Attorney, Agent, or Firm* — Dorsey & Whitney LLP; Bridget M. Hayden, Esq.

(57) ABSTRACT

The present invention includes a method for improving meat, or egg production, or improving feed efficiency in poultry. An amount of GI digestible starch component in relation to the dry matter of a feed is manipulated to within defined levels or ranges, where meat, or egg production or feed conversion are optimized.

15 Claims, 2 Drawing Sheets

(56) References Cited

U.S. PATENT DOCUMENTS

| | | | |
|---|---|---|---|
| 2008/0152754 A1* | 6/2008 | Weakley et al. | 426/2 |
| 2008/0215167 A1 | 9/2008 | Beck | |
| 2009/0092715 A1 | 4/2009 | Beck | |
| 2009/0220641 A1 | 9/2009 | Weakley et al. | |

FOREIGN PATENT DOCUMENTS

| | | |
|---|---|---|
| EP | 0043202 B1 | 4/1984 |
| EP | 0804883 A2 | 11/1997 |
| GB | 2107567 A | 10/1982 |
| WO | 9105482 | 5/1991 |
| WO | 9325616 | 12/1993 |
| WO | 9617525 | 6/1996 |
| WO | 0008947 A1 | 2/2000 |
| WO | 0141795 A1 | 6/2001 |
| WO | 0247473 A2 | 6/2002 |
| WO | 02096191 A2 | 12/2002 |
| WO | 03068256 A1 | 8/2003 |
| WO | 2004113506 A2 | 12/2004 |
| WO | 2008013939 A1 | 1/2008 |
| WO | 2008013940 A2 | 1/2008 |
| WO | 2008013941 A2 | 1/2008 |
| WO | 2009017649 A1 | 2/2009 |

OTHER PUBLICATIONS

Knudsen et al. Ani. Feed Sci. Technol., 130, pp. 114-135, 2006.*
Norberg et al. J. Dairy Sci., 90:418-421, 2007.*
"Chicken Care" downloaded from www.farmanimalshelters.org/care_chicken.htm 5 pages, dated Jan. 2001.*
Sakamoto et al. Br. J. Nutr. (1980) 43, 389-391.*
Channon et al. Recent Advances in Animal Nutrition in Australia, vol. 14 (2003) pp. 197-206.*
Animal Nutrition Handbook, downloaded from www.auburn.edu, dated Sep. 2005, Section 3: "Rumen Microbiology and Fermentation", pp. 55-69.*
Nocek et al. "Site of Digestion of Starch in the GAstrointestinal Tract of Dairy Cows and its Effect on Milk Yield and Composition", Journal of Dairy Science, vol. 74, No. 10, 1991, pp. 3598-3612.
Grant, "Feeding to Maximize Milk Solids", University of Missouri Extension, 5 pages, downloaded from http://extension.missouri.edu/xplor/agguides/dairy/g03100.htm., Oct. 1993.
Ishler et al., "Carbohydrate Nutrition for Lactating Dairy Cattle", pp. 1-11, Penn State Cooperative Extension publication, 2001.
Ishler et al., "From Feed to Milk: Understanding Rumen Function", Extension Circular 422, pp. 1-27, 1996.
Allen, "Formulating Lactating Cow Diets for Carbohydrates", pp. 79-86, Proceedings of the 5th Western Dairy Management Conference, 2001.
Rook, "The Role of Carbohydrate Metabolism in the Regulation of Milk Production", Proc. Nutr. Soc., vol. 38, pp. 309-314, 1979.
Clark et al., "Some Aspects of Feeding High Producing Dairy Cows", Journal of Dairy Science, vol. 63, pp. 873-885, 1980.
Fox et al., "A Net Carbohydrate and Protein System for Evaluating Cattle Diets: III. Cattle Requirements and Diet Adequacy", Journal of Animal Science, vol. 70, pp. 3578-3596, 1992.
Stiffen et al "A Net Carbohydrate and Protein System for Evaluating Cattle Diest: II. Carbohydrate and Protein Availability", Journal of Animal Science, vol. 70, pp. 3562-3577, 1993.
Van Kempen et al., "Near-Infrared Reflectance Spectroscopy in Precision Feed Formulation", Journal of Applied Poultry Science, vol. 6, pp. 417-477, 1997.

* cited by examiner

SELECTIVE FEEDING OF STARCH TO INCREASE MEAT, EGG PRODUCTION OR FEED CONVERSION IN POULTRY

CROSS-REFERENCE TO RELATED APPLICATION

The present application is based on and claims the benefit of U.S. provisional patent application Ser. No. 61/222,782, filed Jul. 2, 2009, the content of which is hereby incorporated by reference in its entirety.

BACKGROUND OF THE INVENTION

The present invention relates to methods of feeding poultry during growth, or egg production, and in particular, it relates to methods for optimizing, meat production, egg production, growth or feed efficiency.

For purposes of this application, the word poultry will be used to refer to domesticated birds which are raised and kept for the purpose of collecting their eggs, or raised for their meat and/or feathers. These domesticated birds are typically members of the superorder Galloanserae (fowl), especially in order Galliformes (which includes chickens, quails and turkeys) and the family Anatidae (in order Anseriformes), commonly known as "waterfowl" (e.g. domestic ducks and domestic geese). The word poultry also includes other birds which are killed for their meat, such as pigeons or doves or birds considered to be game, such as pheasants.

Of particular interest are domesticated chickens, turkeys, geese and ducks which are invaluable in supplying meat or eggs to the population of most industrialized countries. In order to stay profitable, owners have had to optimize the amount of meat, eggs or growth produced. Profits are realized more readily when feed is utilized efficiently for growth and or meat production or egg production.

Nonstructural carbohydrates have been used in attempts to increase growth, meat, and egg production. Such nonstructural carbohydrates include starches, soluble sugars and other reserved carbohydrates. Starches are of particular importance since starch in the form of grains such as corn, sorghum, oats, wheat and the like can be purchased at economical prices or grown by the producer. Starch includes both amylose and amylopectin molecules which in turn are broken down to glucose for availability to poultry.

However, the dynamics of the avian gastrointestinal system are such that the availability of starch in grains to enzymatic digestion can affect both feed efficiency and egg production. Review of the prior art indicates no specific solution to optimizing the feed efficiency and egg production resulting from feeding various starch sources.

Thus the dilemma results of how to increase meat, and egg production since increasing starch intake to improve digestibility can lead to reduced health, production and feed efficiency.

SUMMARY OF THE INVENTION

The present invention includes a method for improving egg production, meat production, growth or feed efficiency in poultry. The invention uses a method of measuring starch digestibility by gastrointestinal (GI) microorganisms as an index of digestibility in poultry. Preferably, the source of gastrointestinal microorganisms is from the rumen of a cannulated ruminant. This Gastrointestinal Digestible Starch Component (GDSC) measurement is then used to formulate diets to specific targets of GDSC. Alternatively, other in vitro or enzymatic assays can be used in the same manner as GDSC.

DETAILED DESCRIPTION OF THE PREFERRED EMBODIMENTS

Figure 1:
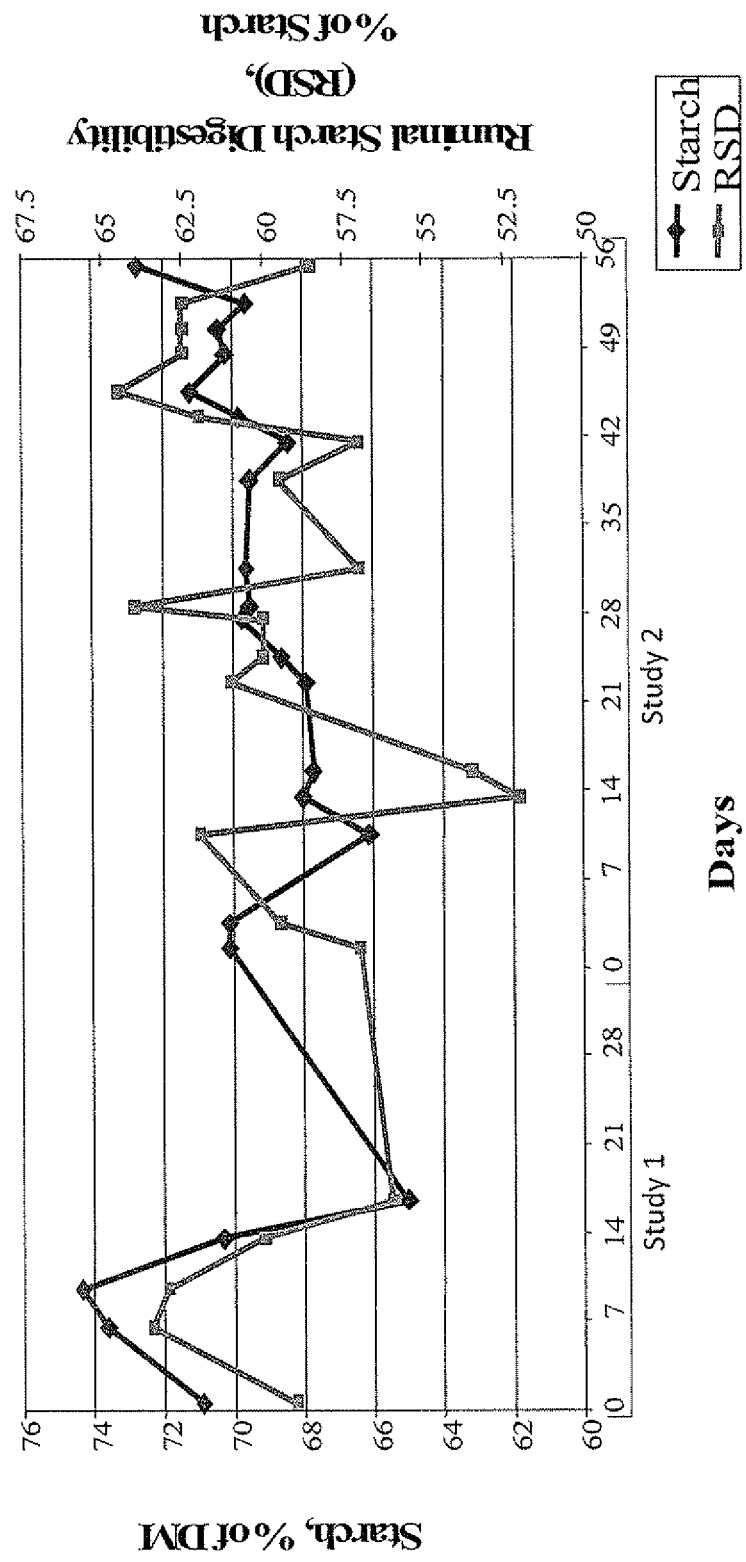
FIG. 1 is a plot of the ruminal starch digestibility and starch analysis over time.

The present invention includes a method of increasing egg production, meat production or improved feed efficiency of poultry by manipulating the dietary GI digestible starch component to dry matter in the feed to within certain weight percent ranges.

GI digestible starch or starch component refers to those carbohydrate fractions that are digested, degraded, solubilized or otherwise broken down to another form when incubated in the presence of GI microorganisms in vitro, in vivo or in situ. Such starch or starch component includes both starch and sugars. GI digestible starch component may also be included within other GI digestible carbohydrate fractions, including but not limited to non-fiber carbohydrates, nonstructural carbohydrates, soluble carbohydrates, soluble fiber, as well as their inverse measurements: fiber carbohydrates, structural carbohydrates, insoluble carbohydrates, insoluble fiber when such other GI digestible carbohydrate fractions are used. Adjustments of these other fractions are less precise and therefore less precise results occur.

Determination of the amount of starch component that is digestible in the GI tract is done by any number of methods. The rate and extent of GI digestibility of starch components may be determined in vivo through the use of cannulas placed in the small intestine of either ruminants or non-ruminants. Digestibility of the starch component may also be done in vitro using GI fluids. The GI digestibility of starch components may also be described as ruminal starch digestibility (RSD). RSD can be determined, for example, using ruminal enzymes and ruminal microorganisms. Tabular values or values predicted by computerized animal models of GI digestible starch component are available and may also be used. Real time measurements of GI starch digestibility may also be taken using near infrared reflectance (NIR) spectroscopy. In addition to spectroscopy, spectrophotometric methods that measure absorption, reflectance or transmission of electromagnetic radiation are also within the scope of the present invention.

A nonexhaustive list of sources for the starch component includes: corn grain, corn silage, corn gluten feed, corn germ meal, corn starch, corn byproducts, sorghum grain, sorghum silage, sorghum byproducts, wheat grain, wheat silage, wheat bran, red dog wheat, wheat germ, wheat flour, wheat middlings, wheat byproducts, barley grain, barley silage, barley byproducts, oat grain, oat silage, oat byproducts, bakery byproducts, hominy feed, peas, brewers grains, distillers grains, malt sprouts, rice, rice bran, rice flour, other rice byproducts, cereal feed, sucrose, lactose, glucose, dextrose, or maltose or any combination thereof. In addition other starch sources such as tubers including but not limited to potatoes, yams, sweet potatoes, cassava (tapioca) and arrow root are also suitable.

The starch component may be processed in a number of ways. As used herein in relation to the starch component the terms "processed" or "process" means grinding, steam flaking, steam rolling, and/or extrusion. The purpose of processing the starch component is to adjust the rate and extent of GDSC needed or desired for the particular production of meat, or eggs, or to achieve a desired feed conversion. Processing can also be chemically or physically protecting the starch from digestibility or any other known method of treatment. Chemically or physically protecting the starch component includes but is not limited to aldehyde treatment, heat treatment, resins, binders or coatings.

The digestibility of the starch component may also be manipulated by combining different proportions of the starch sources described previously and/or the types of processing techniques to reach the needed digestibility value for the poultry end product. The digestibility value needed is determined by the desired outcome, whether it is to maximize, meat production, egg production or feed conversion. Once the digestibility value of the starch component is chosen, the feed is formulated and fed according to prescribed dietary targets, levels or ranges:

Meat production: The starch and sugar sources are combined together in a manner to achieve GI digestible starch component within the approximate range of 15 to 50 weight percent as a percentage of diet DM. The selected value in this range being selected to optimize DMI and meat production, while still maximizing the intake of energy and other essential nutrients needed by the bird.

Egg Production: The starch and sugar sources are combined together in a manner to achieve GI digestible starch component within the approximate range of 15 to 50 weight percent as a percentage of diet DM. The selected value in this range being selected to optimize DMI and egg production, while still maximizing the intake of energy and other essential nutrients needed by the bird.

Feed Conversion: The starch and sugar sources are combined together in a manner to achieve GI digestible starch component within the approximate range of 15 to 50 weight percent as a percentage of diet DM. The selected value in this range being selected to optimize feed conversion, while still maximizing the intake of energy and other essential nutrients needed by the bird.

To determine the optimum meat production, egg production or feed efficiency for the type of structural carbohydrate being used in the feed, bird responses are monitored and adjustments are made to the dietary starch component to optimize growth, feed conversion and or egg production.

The example set forth below more particularly describe this disclosure and are intended as illustrations only since numerous modifications and variations of the disclosure described herein will be apparent to those skilled in the art.

EXAMPLES

Example 1

Influence of Ruminal Starch Digestibility on Turkey Performance. Two studies were conducted on a Turkey farm using 10,000 Hybrid Converter Toms per study. Samples of corn were collected at the time of feed manufacturing and sent to a laboratory for in vitro analysis of crude starch. Ruminal starch digestibility (RSD) was determined by in vitro analysis of samples using ruminal microorganisms.

The average daily gain (ADG) in pounds, feed conversion rate (FCR) in pounds of feed per pound of gain, the final body weight in pounds and the mortality rate in each of the studies are shown below in Table 1.

TABLE 1

|  | Study 1 | Study 2 |
| --- | --- | --- |
| ADG (lbs.) | .252 | .30 |
| FCR (lbs. of feed/lb. of gain) | 2.73 | 2.36 |
| Final BW (lbs.) | 30.9 | 37.8 |
| Mortality | 7.27 | 10.36 |

FIG. 1 is a plot of the starch content of the feed as a percentage of dry matter over time and the ruminal starch digestibility as percentage of starch over time. The corn samples exhibited considerable variation. The crude starch ranged from 65 percent to 75 percent of the dry matter. The ruminal starch digestibility ranged from 52 percent to 65 percent of the starch.

Each corn sample was regressed on ADG three days post-sampling to establish temporal relationships between corn digestibility and associated performance. In other words, a 3 day lag was assumed between the intake and the effect of the intake. Study 2 included a greater number of observations than study 1. The RSD values were translated into their corresponding ruminal starch degradability values and multiplied by the starch content of the sample. The resulting expression of ruminal starch digestibility on a dry matter basis better reflects the variation in both crude starch and digestibility. The ruminal starch digestibility as a percent of dry matter ranged from 35 to 47% of dry matter. See FIG. 2.

Figure 2:
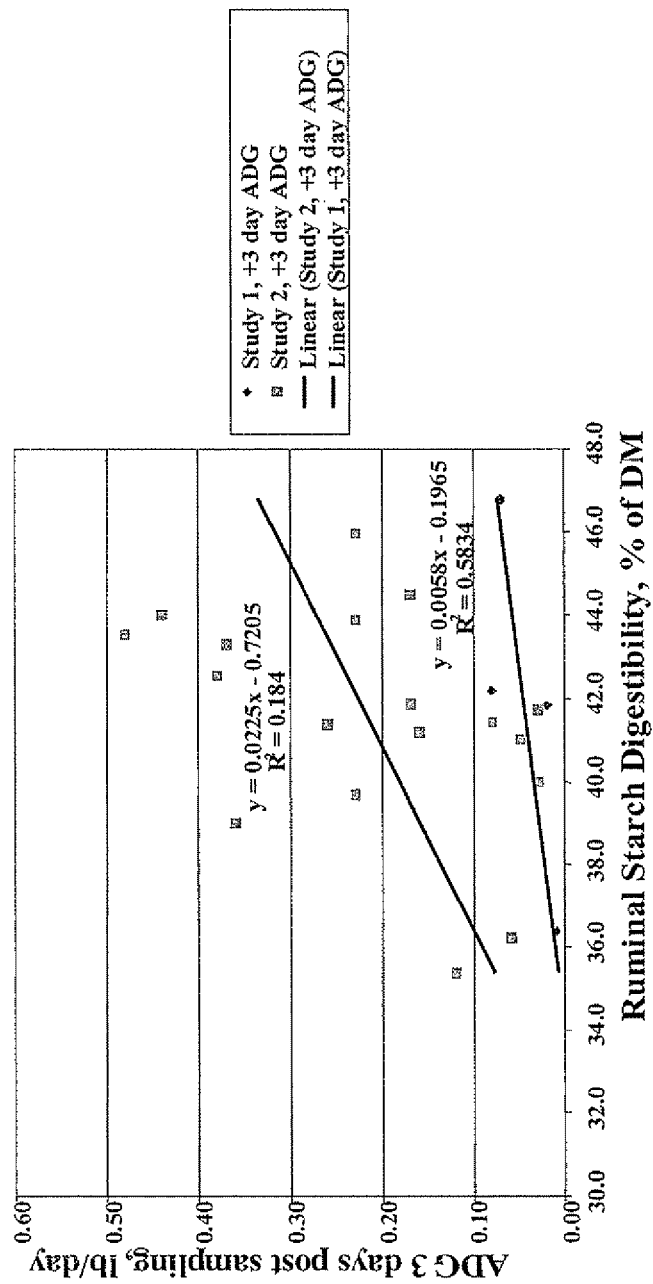
FIG. 2 is a plot of the ADG 3 days later versus starch digestibility.

The relationship between "third day ADG" and "Starch Digestibility as percentage (%) of dry matter" was positive as seen in FIG. 2. This explained 58% of the variation of ADG in study 1 and 18% of the variation in ADG in study 2, demonstrating that Starch Digestibility as a percentage of dry matter has a high relationship with, and potential effect on, ADG. The 12 percentage unit spread in corn starch digestibility (35%-47%) created a 0.27 lb/day potential in incremental ADG in study 2.

The first study primarily dealt with the brooder stage production of 0 to 6 weeks. There was less variation and more impact on early nutrition. There is a lack of enzymes to digest starch and other substrates up to 21 days post placement. Thus, the growth is more dependent on energy intake. Increasing the availability of starch impacted the growth rate and thus the birds developed earlier leading to an impact of days to market.

At later stages of growth (study 2), there is more variation which is indicated by the reduced $R^2$ of study 2 versus $R^2$ of study 1. However, the need for energy intake could be just as important as the turkey grows.

ADG of about 0.3 is a desirable outcome. Improving ADG by 0.01 can lead to market arrival of 4 days earlier and can lead to substantial savings in feed.

Although the present invention has been described with reference to preferred embodiments, workers skilled in the art will recognize that changes may be made in form and detail without departing from the spirit and scope of the invention.

What is claimed is:

1. A method for improving at least one of meat production, egg production or feed efficiency in poultry, the method comprising:

feeding the poultry a starch component in dry matter of a poultry feed;

analyzing at least one of meat production, egg production or feed efficiency in the poultry ingesting the poultry feed;

receiving a gastrointestinal starch digestibility level for the starch component, wherein the gastrointestinal starch digestibility level is calculated based on correlating a measured ruminal starch digestibility level of the starch component with the gastrointestinal starch digestibility level; and modifying the starch component in the poultry feed to adjust the received gastrointestinal starch digestibility level to improve the analyzed at least one of meat production, egg production or feed efficiency in the poultry.

2. The method of claim 1, wherein the gastrointestinal starch digestibility level is modified to a range from between 15 to 50 weight percent in relation to the dry matter of the poultry feed.

3. The method of claim 2, wherein modifying comprises increasing the gastrointestinal starch digestibility level in the starch component to a high end of the 15 to 50 weight percent range based on receiving a low gastrointestinal starch digestibility level relative to the weight percent range.

4. The method of claim 2, wherein modifying comprises decreasing the gastrointestinal starch digestibility level in the starch component to a low end of the 15 to 50 weight percent range based on receiving a high gastrointestinal starch digestibility level relative to the weight percent range.

5. The method of claim 1, wherein the ruminal starch digestibility level for the starch component is determined based on in vitro measurements.

6. The method of claim 1, wherein the ruminal starch digestibility level for the starch component is determined based on measurements from cannulated ruminants.

7. The method of claim 1, wherein the ruminal starch digestibility level for the starch component is determined based on in situ measurements.

8. The method of claim 1, wherein the calculated gastrointestinal starch digestibility level is further based on spectrophotometric methods.

9. The method of claim 1, wherein the calculated gastrointestinal starch digestibility is further based on near infrared reflectance spectroscopy.

10. The method of claim 1, wherein the calculated gastrointestinal starch digestibility is further based on predetermined digestibility values.

11. The method of claim 1, wherein modifying comprises combining starch components of differing gastrointestinal starch digestibility levels.

12. The method of claim 1, wherein modifying comprises processing the starch component to increase or decrease the received gastrointestinal starch digestibility level.

13. The method of claim 12, wherein processing comprises at least one of grinding, steam flaking, steam rolling, or extrusion.

14. The method of claim 1, wherein carbohydrate fractions contain the starch component, the carbohydrate fractions comprising at least one of non-fiber carbohydrates, non-structural carbohydrates, soluble carbohydrates or soluble fiber.

15. The method of claim 1, wherein the starch component comprises at least one of:

corn grain, corn silage, corn gluten feed, corn germ meal corn starch, corn byproducts, sorghum grain, sorghum silage, sorghum byproducts, wheat grain, wheat silage, wheat bran, red dog wheat, wheat germ, wheat flour, wheat middlings, wheat byproducts, barley grain, barley silage, barley byproducts, oat grain, oat silage, oat byproducts, bakery byproducts, hominy feed, peas, brewers grains, distillers grains, malt sprouts, rice, rice bran, rice flour, rice byproducts, cereal, sucrose, lactose, glucose, dextrose, maltose, cassava, or starchy tubers.

* * * * *